US011965649B1

(12) United States Patent
Tang

(10) Patent No.: US 11,965,649 B1
(45) Date of Patent: Apr. 23, 2024

(54) MIRROR

(71) Applicant: ZHONGSHAN JINGXIAN PHOTOELECTRIC TECHNOLOGY CO., LTD., Zhongshan (CN)

(72) Inventor: Jingchuan Tang, Zhongshan (CN)

(73) Assignee: ZHONGSHAN JINGXIAN PHOTOELECTRIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/453,646

(22) Filed: Aug. 22, 2023

(30) Foreign Application Priority Data

Jul. 17, 2023 (CN) ......................... 202321883209.8

(51) Int. Cl.

| | |
|---|---|
| ***F21V 33/00*** | (2006.01) |
| ***F21V 3/06*** | (2018.01) |
| ***F21Y 103/10*** | (2016.01) |
| ***F21Y 113/17*** | (2016.01) |
| ***F21Y 115/10*** | (2016.01) |

(52) U.S. Cl.
CPC ............ *F21V 33/004* (2013.01); *F21V 3/062* (2018.02); *F21Y 2103/10* (2016.08); *F21Y 2113/17* (2016.08); *F21Y 2115/10* (2016.08)

(58) Field of Classification Search
CPC .... F21V 33/004; F21V 3/062; F21Y 2113/17; F21Y 2103/10; F21Y 2115/10
See application file for complete search history.

(56) References Cited

PUBLICATIONS

Liu et al., CN 207837042, Sep. 2018 (Year: 2018).*
Chen, WO 2021179500, Sep. 2021 (Year: 2021).*
Chen et al., WO 2023065608, Apr. 2023 (Year: 2023).*

* cited by examiner

*Primary Examiner* — Mary Ellen Bowman
(74) *Attorney, Agent, or Firm* — Daniel M. Cohn; Howard M. Cohn

(57) ABSTRACT

A mirror capable of emitting lights from multiple angles includes an outer frame defining a middle hole, a mirror body disposed in the middle hole, a first LED light strip, a first annular light guide cover, a light strip frame, and a second LED light strip. The first LED light strip is disposed on an inner wall of the middle hole and disposed on a front end of the mirror body. The first annular light guide cover is disposed on the outer frame and disposed in a light-emitting direction of the first LED light strip. The light strip frame is disposed on a rear of the mirror body. The second LED light strip is disposed on the light strip frame. An annular light transmitting portion is disposed on the mirror body. The second LED light strip is disposed on an inner side of the annular light transmitting portion.

19 Claims, 4 Drawing Sheets

MIRROR

TECHNICAL FIELD

The present disclosure relates to a technical field of mirrors, and in particular to a mirror capable of emitting lights from multiple angles.

BACKGROUND

In daily life, people usually need to use mirrors to organize their appearance. In order to increase functions of the mirrors and facilitate use of the mirrors in a dark environment, a light strip acting as a light source is disposed inside a conventional mirror. Light emitted by the light strip is transmitted through a light guide ring of the conventional mirror, so the conventional mirror has an illumination function. However, since the light is guided by the light guide ring, an illumination area is limited and a display effect is single, which cannot realize multi-angle illumination.

SUMMARY

A purpose of the present disclosure is to overcome defects in the prior art. The present disclosure provides a mirror capable of emitting lights from multiple angles, which controls irradiation of lights from different angles, thus satisfying needs of consumers fora mirror with lighting effects from different angles.

To achieve the above purpose, the present disclosure provides the mirror capable of emitting lights from multiple angles. The mirror comprises an outer frame defining a middle hole, a mirror body disposed in the middle hole, a first LED light strip, a first annular light guide cover, a light strip frame, and a second LED light strip.

The first LED light strip is disposed on an inner wall of the middle hole and disposed on a front end of the mirror body. The first annular light guide cover is disposed on the outer frame and disposed in a light-emitting direction of the first LED light strip. The light strip frame is disposed on a rear of the mirror body. The second LED light strip is disposed on an outer face of the light strip frame. An annular light transmitting portion is disposed on the mirror body. The second LED light strip is disposed on an inner side of the annular light transmitting portion. In the present disclosure, a front portion of an outer side of the mirror body and the front of the mirror body are able to emit light, which satisfies needs of the consumers for the mirror with lighting effects from different angles.

In one embodiment, the mirror further comprises a third LED light strip and a second annular light guide cover. The third LED light strip is disposed on an outer surface of the outer frame and disposed on a rear end of the mirror body. The second annular light guide cover is disposed on the outer frame and disposed in a light-emitting direction of the third LED light strip. In the embodiment, the lights are emitted from the rear end of the mirror body, which improves an atmosphere and aesthetics of the mirror.

In one embodiment, a first annular loading portion is protruded from a middle of the inner wall of the middle hole. An annular protruding portion is disposed on an inner side surface of the first annular loading portion. A first protruding fixing portion and a second protruding fixing portion are sequentially disposed on an outer side surface of the annular protruding portion in parallel. A first annular groove is formed between the first protruding fixing portion and the second protruding fixing portion. The rear of the mirror body is fixedly attached to the first annular loading portion. The third LED light strip and the second annular light guide cover are disposed in the first annular groove. In the embodiment, the third LED light strip and the second annular light guide cover are easily mounted.

In one embodiment, the outer frame comprises an arc-shaped fixing portion. The arc-shaped fixing portion is connected with the first protruding fixing portion and extends towards the front end of the mirror body. An annular connecting portion is vertically disposed on a front end of the arc-shaped fixing portion. An annular fixing portion is horizontally disposed on a front end of the annular connecting portion. An inner side surface of the arc-shaped fixing portion, an inner side surface of the annular connecting portion, and an inner side surface of the annular fixing portion jointly define a second annular groove. The first LED light strip and the first annular light guide cover are disposed in the second annular groove. In the embodiment, the first LED light strip and the first annular light guide cover are easily mounted.

In one embodiment, a first annular mounting portion is disposed on an outer side surface of the first annular loading portion. A second annular mounting portion is disposed on an inner side surface of the annular fixing portion. Two sides of the first annular light guide cover are respectively fixed to the first annular mounting portion and the second annular mounting portion. Therefore, the first annular light guide cover is easily mounted.

In one embodiment, the mirror further comprises an anti-mist device disposed on the rear of the mirror body. The anti-mist device prevents mist from being generated on the mirror body, so a use effect of the mirror is not affected.

In one embodiment, each of the first LED light strip, the second LED light strip, and the third LED light strip emits lights of at least two colors.

In one embodiment, the mirror further comprises a control module disposed on the rear of the mirror body. The control module is electrically and signally connected with the first LED light strip, the second LED light strip, the third LED light strip, and the anti-mist device. The control module controls colors and brightness of the lights emitted by the first LED light strip, the second LED light strip, and the third LED light strip to meet the needs of the use for a light illumination effect of the mirror at different angles and an emission of different colors of lights.

In one embodiment, the mirror further comprises a driving power supply disposed on the rear of the mirror body. The driving power supply is electrically connected with the control module.

In one embodiment, the mirror further comprises a rear plate. A second annular loading portion is disposed on one end, away from the mirror body, of the annular protruding portion. The control module, the driving power supply, and the anti-mist device are disposed on the rear of the mirror body and are disposed in the middle hole. The rear plate is detachably mounted on the second annular loading portion to seal the middle hole.

In one embodiment, the mirror further comprises a touch switch disposed on the mirror body. The touch switch is electrically and signally connected with the control module.

In one embodiment, a voice recognition module is disposed in the control module.

In one embodiment, the mirror further comprises an application (APP) control component. The APP control component is electrically and signally connected with the control module.

In one embodiment, the first LED light strip, the second LED light strip, and the third LED light strip are any one of a chip on board (COB) LED light strip, a red-green-blue correlated color temperature (RGBCCT) LED light strip, a red-green-blue-white (RGBW) LED light strip, an RGB LED light strip, and a CCT LED light strip.

In one embodiment, the second annular light guide cover is a polycarbonate (PC) light transmitting cover.

In one embodiment, sawtooth structures are disposed on a light-emitting surface of the first annular light guide cover.

In one embodiment, the annular light transmitting portion is a frosted structure, a fine-grained surface structure or a sawtooth structure.

In one embodiment, the mirror further comprises a first hanging rack horizontally disposed on a rear of the outer frame of the mirror and/or a second hanging rack vertically disposed on the rear of the outer frame of the mirror.

In one embodiment, the outer frame is an aluminum metal frame, which is convenient for production and processing and has a good heat dissipation effect.

Compared with the prior art, the mirror of the present disclosure is capable of emitting the lights from the front of the mirror body, the front portion of the outer side of the mirror body, and the rear of the mirror body, which improves the atmosphere and aesthetics of the mirror when in use, so the mirror is able to control the lights emitted from different angles, thus satisfying needs of the consumers for the mirror with lighting effects from different angles and needs of the consumers for a mirror applying to different scenes.

The outer frame of the mirror of the present disclosure has a simple and ingenious structure, has a beautiful appearance, and is convenient for production, processing, and assembly operations. The first annular loading portion is disposed in the middle hole, which is convenient for mounting the mirror body. The annular protruding portion is disposed on the inner side surface of the first annular loading portion. The first protruding fixing portion and the second protruding fixing portion are disposed on the annular protruding portion, which is convenient for mounting the third LED light strip and the second annular light guide cover. The arc-shaped fixing portion is connected with the first protruding fixing portion and extends towards the front end of the mirror body. The annular connecting portion is vertically disposed on the front end of the arc-shaped fixing portion. The annular fixing portion is horizontally disposed on the front end of the annular connecting portion. Therefore, the second annular groove is formed on the front portion of the outer side of the mirror body, which is convenient for mounting the first LED light strip and the first annular light guide cover. The second annular loading portion is disposed on the one end, away from the mirror body, of the annular protruding portion, which is convenient for detachably mounting the rear plate. The rear plate protects electrical devices of the present disclosure, which is convenient for later replacement and maintenance of the electrical devices.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
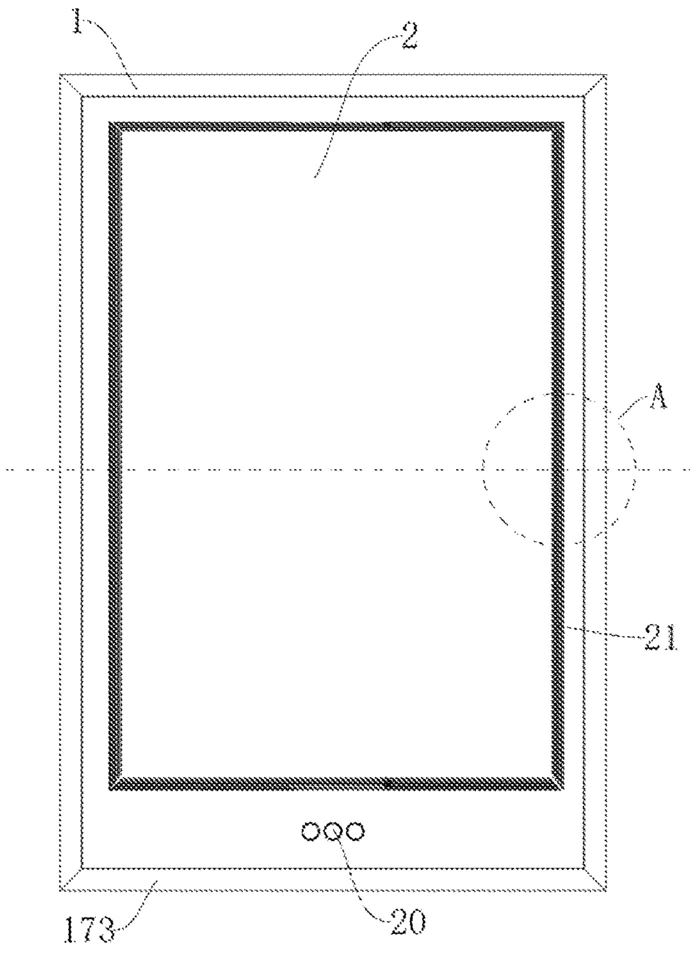
FIG. 1 is a front side elevational schematic diagram of a mirror capable of emitting lights from multiple angles of the present disclosure.

1—outer frame; 11—middle hole; 12—first annular loading portion; 121—first annular mounting portion; 13—annular protruding portion; 14—first protruding fixing portion; 15—second protruding fixing portion; 16—first annular groove; 171—arc-shaped fixing portion; 172—annular connecting portion; 173—annular fixing portion; 1731—second annular mounting portion; 18—second annular groove; 19—second annular loading portion; 2—mirror body; 21—annular light transmitting portion; 3—first LED light strip; 4—first annular light guide cover; 51—light strip frame; 52—second LED light strip; 6—third LED light strip; 7—second annular light guide cover; 8—anti-mist device; 9—control module; 10—driving power supply; 20—touch switch; 30—first hanging rack; 40—second hanging rack; 50—back plate.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that all directional indications (such as up, down, left, right, front, back . . . ) in the embodiments of the present disclosure are only used to explain the relationship, relative positional relationship, movement conditions, etc., between the components in a specific posture (as shown in the drawings), if the specific posture changes, the directional indications change accordingly.

It should be noted in the description of the present disclosure that, unless otherwise regulated and defined, terms such as "installation," "bonded," and "connection" shall be understood in broad sense, and for example, may refer to fixed connection or detachable connection or integral connection, may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

It should be understood in the embodiments of the present disclosure that terms such as "first" and "second" are only used for the purpose of description, rather than being understood to indicate or imply relative importance or hint the number of indicated technical features. Thus, the feature limited by "first" and "second" can explicitly or impliedly include one or more features. In addition, the term "and/or" depict relationship between associated objects and there are three relationships thereon. For example, A and/or B may indicate A exists alone, A and B exist at the same time, and B exists alone. In addition, the technical solutions between the various embodiments may be combined with each other, but the combination should be realized by those skilled in the art. When the combination of the technical solutions is contradictory or cannot be implemented, it should be considered that the combination of the technical solutions does not exist or is not within the protection scope of the present disclosure.

As shown in FIGS. 1-6, the present disclosure provides a mirror capable of emitting lights from multiple angles. The mirror comprises an outer frame 1, a mirror body 2, a first LED light strip 3, a first annular light guide cover 4, a light strip frame 51, and a second LED light strip 52.

The outer frame 1 defines a middle hole 11. The mirror body 2 is disposed in the middle hole 11. The first LED light strip 3 is disposed on an inner wall of the middle hole 11 and disposed on a front end of the mirror body 2. The first annular light guide cover 4 is disposed on the outer frame 1 and disposed in a light-emitting direction of the first LED light strip 3. Sawtooth structures are disposed on a light-emitting surface of the first annular light guide cover 4. The sawtooth structures make the lights emitted therefrom have different angles, makes the lights soft, and makes an appearance of the lights emitted rich.

The light strip frame 51 is disposed on a rear of the mirror body 2. The second LED light strip 52 is disposed on an outer face of the light strip frame 51. An annular light transmitting portion 21 is disposed on the mirror body. The annular light transmitting portion 21 is a frosted structure, a fine-grained surface structure or a sawtooth structure. The second LED light strip 52 is disposed on an inner side of the annular light transmitting portion 21.

The mirror further comprises a third LED light strip 6 and a second annular light guide cover 7. Optionally, the second annular light guide cover 7 is a polycarbonate (PC) light transmitting cover. The third LED light strip 6 is disposed on an outer surface of the outer frame 1 and disposed on a rear end of the mirror body 2. The second annular light guide cover 7 is disposed on the outer frame 1 and disposed in a light-emitting direction of the third LED light strip 6. In the embodiment, the lights are emitted from the rear end of the mirror body, which improves an atmosphere and aesthetics of the mirror. The mirror of the present disclosure is capable of emitting the lights from a front of the mirror body 2, a front portion of an outer side of the mirror body 2, and the rear of the mirror body 2, so the mirror is able to control the lights emitted from different angles, thus satisfying needs of consumers for the mirror with lighting effects from different angles.

The mirror further comprises a first hanging rack 30 horizontally disposed on a rear of the outer frame 1 of the mirror and/or a second hanging rack 40 vertically disposed on the rear of the outer frame 1 of the mirror. Specifically, one of the first hanging rack 30 and the second hanging rack 40 may be disposed on the outer frame or both of the first hanging rack 30 and the second hanging rack 40 are disposed on the outer frame, which is determined by a method that the mirror is hung on a wall, so as to meet different usage situations.

Figure 2:
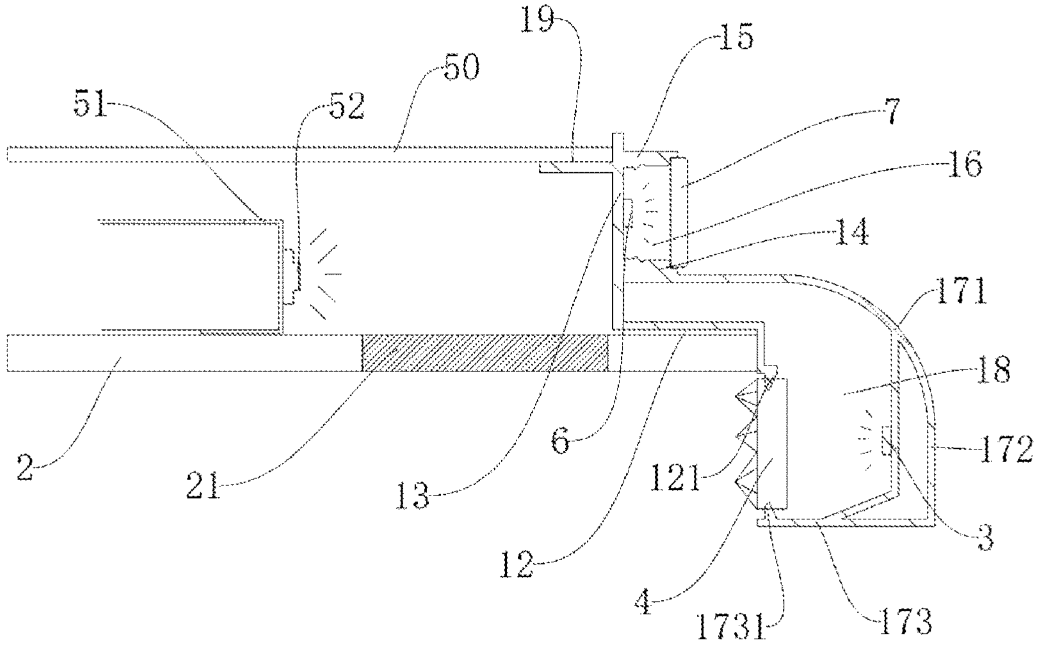
FIG. 2 is an enlarged cross-sectional schematic diagram of portion A shown in FIG. 1.
Figure 3:
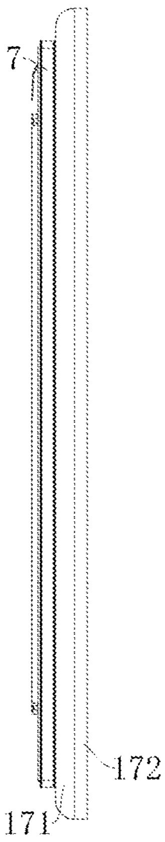
FIG. 3 is a side elevational schematic diagram of the mirror capable of emitting lights from multiple angles of the present disclosure.
Figure 5:
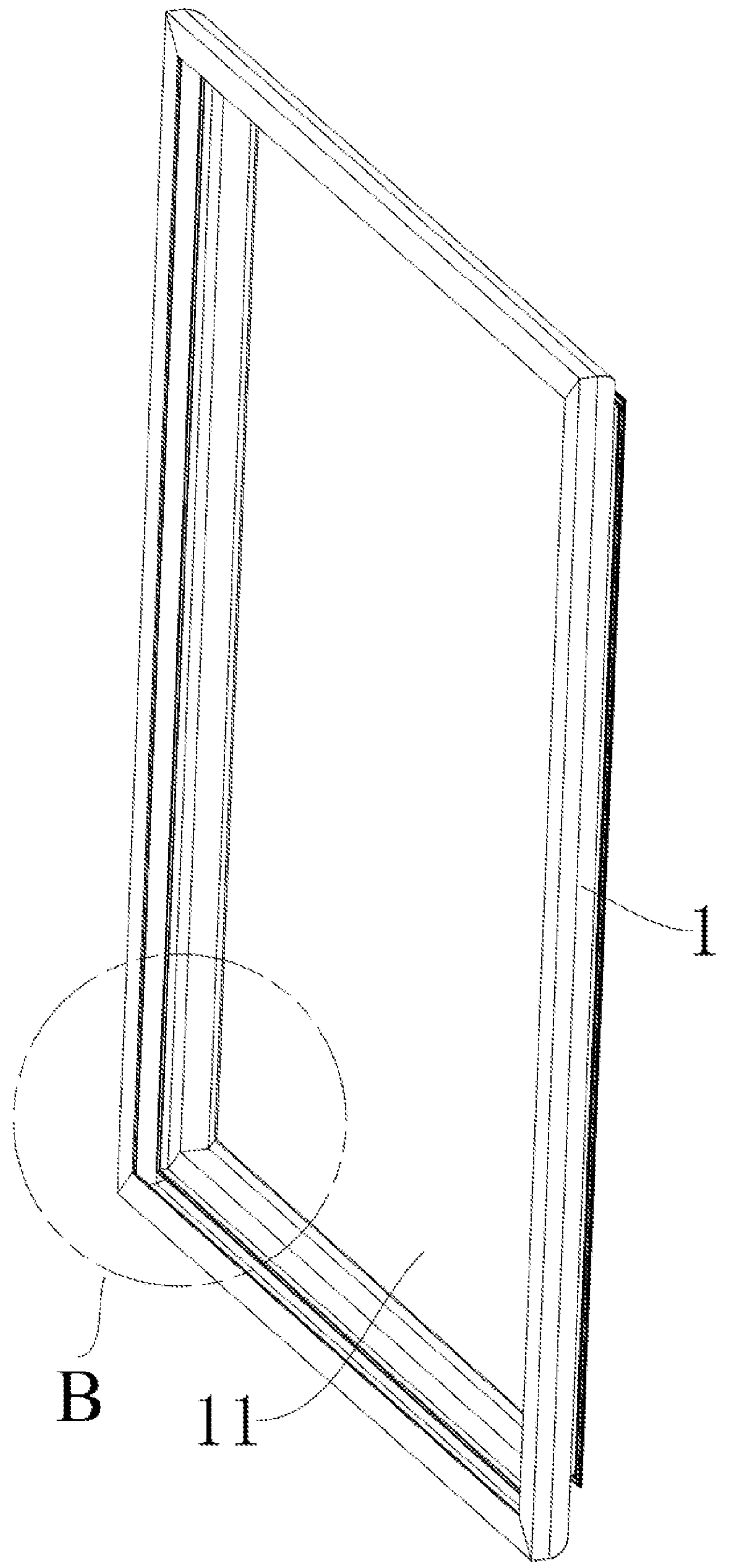
FIG. 5 is a structural schematic diagram of an outer frame of the present disclosure.
Figure 6:
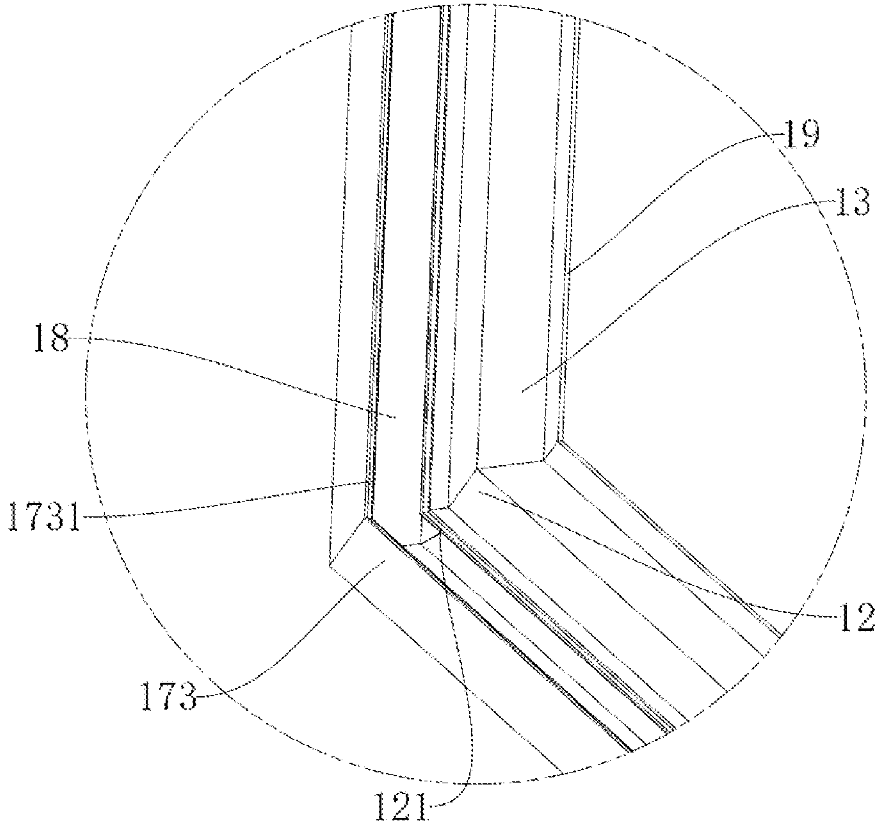
FIG. 6 is an enlarged schematic diagram of portion B shown in FIG. 5.

As shown in FIGS. 2, 5, and 6, a first annular loading portion 12 is protruded from a middle of the inner wall of the middle hole 11. An annular protruding portion 13 is disposed on an inner side surface of the first annular loading portion 12. A first protruding fixing portion 14 and a second protruding fixing portion 15 are sequentially disposed on an outer side surface of the annular protruding portion 13 in parallel. A first annular groove 16 is formed between the first protruding fixing portion 14 and the second protruding fixing portion 15. The rear of the mirror body 2 is fixedly attached to the first annular loading portion 12. The third LED light strip 6 and the second annular light guide cover 7 are disposed in the first annular groove 16. Therefore, the third LED light strip and the second annular light guide cover are conveniently mounted on the rear of the mirror body 2.

The outer frame 1 comprises an arc-shaped fixing portion 171. The arc-shaped fixing portion 171 is connected with the first protruding fixing portion 14 and extends towards the front end of the mirror body 2. An annular connecting portion 172 is vertically disposed on a front end of the arc-shaped fixing portion 171. An annular fixing portion 173 is horizontally disposed on a front end of the annular connecting portion 172. An inner side surface of the arc-shaped fixing portion 171, an inner side surface of the annular connecting portion 172, and an inner side surface of the annular fixing portion 173 jointly define a second annular groove 18. The first LED light strip 3 and the first annular light guide cover 4 are disposed in the second annular groove 18. Therefore, the first LED light strip 3 and the first annular light guide cover 4 are conveniently mounted and fixed.

A limiting portion configured to fix the mirror body 2 is disposed on an outer side surface of the first annular loading portion 12. A first annular mounting portion 121 is disposed on one side of the limiting portion. A second annular mounting portion 1731 is disposed on an inner side surface of the annular fixing portion 173. Two sides of the first annular light guide cover 4 are respectively fixed to the first annular mounting portion 121 and the second annular mounting portion 1731.

The outer frame 1 of the mirror of the present disclosure has a simple and ingenious structure. The first annular loading portion is disposed in the middle hole, which is convenient for fixing the mirror body 2 to the outer frame 1, Therefore, the middle hole 11 is sealed by the mirror body 2 and the lights from the rear of the mirror body 2 is blocked by the mirror body. The annular protruding portion 13 is disposed on the inner side surface of the first annular loading portion 12. The first protruding fixing portion 14 and the second protruding fixing portion 15 are disposed on the annular protruding portion 13, which is convenient for mounting the third LED light strip 6 and the second annular light guide cover 7 on the rear of the mirror body 2. Therefore, the lights are emitted from the rear of the mirror body 2. The arc-shaped fixing portion 171 is connected with the first protruding fixing portion 14 and extends towards the front end of the mirror body 2. The annular connecting portion 172 is vertically disposed on the front end of the arc-shaped fixing portion 171. The annular fixing portion 173 is horizontally disposed on the front end of the annular connecting portion 172. By such arrangements, the second annular groove 18 is formed on the front portion of the outer side of the mirror body 2, which is convenient for mounting the first LED light strip 3 and the first annular light guide cover 4 and enables the front portion of the outer side of the main body to emit the lights.

Optionally, the outer frame 1 is an aluminum metal frame, which is convenient for production and processing and has a good heat dissipation effect, which improves service life of the first LED light strip 3, the second LED light strip 52, and the third LED light strip 6.

Figure 4:
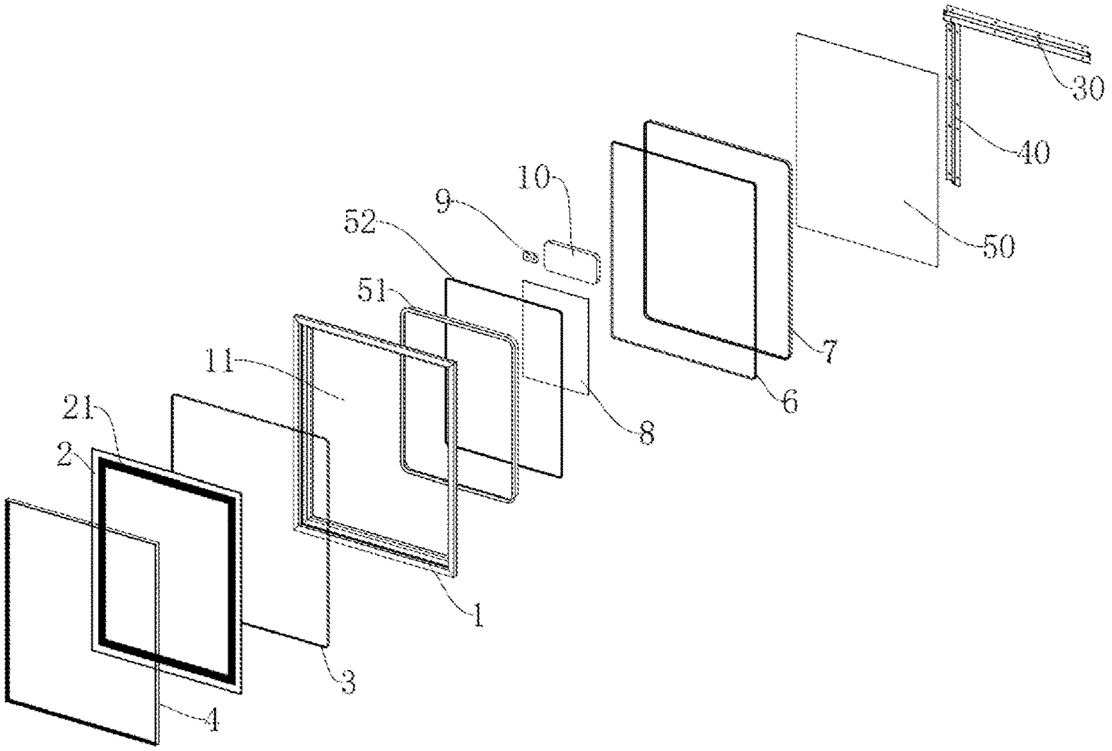
FIG. 4 is an exploded schematic diagram of the mirror capable of emitting lights from multiple angles of the present disclosure.

As shown in FIG. 4, the mirror further comprises an anti-mist device 8 disposed on the rear of the mirror body 2. Each of the first LED light strip 5, the second LED light strip 52, and the third LED light strip 6 emits lights of at least two colors. Optionally, the mirror further comprises a control module 9 disposed on the rear of the mirror body 2. The control module 9 is electrically and signally connected with the first LED light strip 3, the second LED light strip 52, the third LED light strip 6, and the anti-mist device 8. The mirror further comprises a touch switch 20 disposed on the mirror body 2. The touch switch 20 is electrically and signally connected with the control module 9. When in use, the touch switch 20 transmits signals to the control module 9. The control module 9 controls the first LED light strip 3, the second LED light strip 52, and the third LED light strip 6 to work and controls colors and brightness of the lights emitted by the first LED light strip 3, the second LED light strip 52, and the third LED light strip 6, so as to realize light emitting of the mirror at different angles.

Each of the first LED light strip 5, the second LED light strip 52, and the third LED light strip 6 emits the lights of at least two colors. The first LED light strip 3, the second LED light strip 52, and the third LED light strip 6 are any one of a chip on board (COB) LED light strip, a red-green-blue correlated color temperature (RGBCCT) LED light strip, a red-green-blue-white (RGBW) LED light strip, an RGB LED light strip, and a CCT LED light strip. According to a product design, different light strips with different functions are selected, enabling the mirror to emit the lights in various colors and different directions. The control module 9 controls the anti-mist device 8 to work, thereby removing mist on a surface of the mirror body 2, which is convenient for the customers to use in different environments and places.

The mirror further comprises a driving power supply 10 disposed on the rear of the mirror body 2. The driving power supply 10 is electrically connected with the control module 9. The driving power supply 10 supplies power to the first LED light strip 3, the second LED light strip 52, the third LED light strip 6, the anti-mist device 8, the control module 9, and the touch switch 20, so that the mirror is able to be used in a scene where power source is not convenient to connect. Of course, in other embodiments, the mirror may further comprise a plug electrically connected with the control module 9. The plug is electrically connected with outside, so as to supply power to the first LED light strip 3, the second LED light strip 52, the third LED light strip 6, the anti-mist device 8, the control module 9, and the touch switch 20.

Optionally, a voice recognition module is disposed in the control module 9.

When in use, the voice recognition module receives a voice command of the user and covert the voice command into a signal transmitted to the control module 9. The control module 9 drives different electrical devices to work according to a received signal from the voice recognition module. The mirror further comprises an application (APP) control component. The APP control component is electrically and signally connected with the control module 9. The APP control component is installed on an external mobile terminal, and the user is able to control the mirror through the APP control component, which improves diversity of functions of the mirror.

Optionally, the mirror further comprises a rear plate 50. A second annular loading portion 19 is disposed on one end, away from the mirror body, of the annular protruding portion 13. The control module 9, the driving power supply 10, and the anti-mist device 8 are disposed on the rear of the mirror body 2 and are disposed in the middle hole 11. The rear plate 50 is detachably mounted on the second annular loading portion 19 to seal the middle hole 11.

By sealing the middle hole 11 through the back plate 50, the light strip frame 51, the second LED light strip 52, the control module 9, the driving power supply 10, and the anti-mist device 8 are protected from influence of the environment, thus improving service life of the mirror. In addition, the rear plate 50 is detachably connected with the outer frame 1. For example, the rear plate 50 is detachably connected with the outer frame 1 by screws, bolts or clamping pieces. When the mirror needs to be maintained, the rear plate 50 is detached to replace components of the mirror or repair the mirror of the present disclosure.

The above embodiments are optional embodiments of the present disclosure, but the embodiments of the present disclosure are not limited by the foregoing embodiments, and any other changes, modifications, substitutions, combinations, and simplification made without departing from the spirit and principle of the present disclosure should be regarded as equivalent replacement manners, which are all included within the protection scope of the present disclosure.

What is claimed is:

1. A mirror, comprising:

an outer frame defining a middle hole, a mirror body disposed in the middle hole, a first LED light strip, a first annular light guide cover, a light strip frame, and a second LED light strip;

wherein the first LED light strip is disposed on an inner wall of the middle hole and disposed on a front end of the mirror body; the first annular light guide cover is disposed on the outer frame and disposed in a light-emitting direction of the first LED light strip; the light strip frame is disposed on a rear of the mirror body; the second LED light strip is disposed on an outer face of the light strip frame; an annular light transmitting portion is disposed on the mirror body; the second LED light strip is disposed on an inner side of the annular light transmitting portion.

2. The mirror according to claim 1, wherein the mirror further comprises a third LED light strip and a second annular light guide cover; the third LED light strip is disposed on an outer surface of the outer frame and disposed on a rear end of the mirror body; the second annular light guide cover is disposed on the outer frame and disposed in a light-emitting direction of the third LED light strip.

3. The mirror according to claim 2, wherein a first annular loading portion is protruded from a middle of the inner wall of the middle hole; an annular protruding portion is disposed on an inner side surface of the first annular loading portion; a first protruding fixing portion and a second protruding fixing portion are sequentially disposed on an outer side surface of the annular protruding portion in parallel; a first annular groove is formed between the first protruding fixing portion and the second protruding fixing portion; the rear of the mirror body is fixedly attached to the first annular loading portion; the third LED light strip and the second annular light guide cover are disposed in the first annular groove.

4. The mirror according to claim 3, wherein the outer frame comprises an arc-shaped fixing portion; the arc-shaped fixing portion is connected with the first protruding fixing portion and extends towards the front end of the mirror body; a annular connecting portion is vertically disposed on a front end of the arc-shaped fixing portion; an annular fixing portion is horizontally disposed on a front end of the annular connecting portion; an inner side surface of the arc-shaped fixing portion, an inner side surface of the annular connecting portion, and an inner side surface of the annular fixing portion jointly define a second annular groove; the first LED light strip and the first annular light guide cover are disposed in the second annular groove.

5. The mirror according to claim 4, wherein a first annular mounting portion is disposed on an outer side surface of the first annular loading portion, a second annular mounting portion is disposed on an inner side surface of the annular fixing portion; two sides of the first annular light guide cover are respectively fixed to the first annular mounting portion and the second annular mounting portion.

6. The mirror according to claim 3, wherein the mirror further comprises an anti-mist device disposed on the rear of the mirror body.

7. The mirror according to claim 6, wherein each of the first LED light strip, the second LED light strip, and the third LED light strip emits lights of at least two colors.

8. The mirror according to claim 7, wherein the mirror further comprises a control module disposed on the rear of the mirror body; the control module is electrically and signally connected with the first LED light strip, the second LED light strip, the third LED light strip, and the anti-mist device.

9. The mirror according to claim 8, wherein the mirror further comprises a driving power supply disposed on the rear of the mirror body; the driving power supply is electrically connected with the control module.

10. The mirror according to claim 9, wherein the mirror further comprises a rear plate; a second annular loading portion is disposed on one end, away from the mirror body, of the annular protruding portion; the control module, the driving power supply, and the anti-mist device are disposed on the rear of the mirror body and are disposed in the middle hole; the rear plate is detachably mounted on the second annular loading portion; the rear plate is configured to seal the middle hole.

11. The mirror according to claim 8, wherein the mirror further comprises a touch switch disposed on the mirror body; the touch switch is electrically and signally connected with the control module.

12. The mirror according to claim 8, wherein a voice recognition module is disposed in the control module.

13. The mirror according to claim 8, wherein the mirror further comprises an application (APP) control component; the APP control component is electrically and signally connected with the control module.

14. The mirror according to claim 8, wherein the first LED light strip, the second LED light strip, and the third LED light strip are any one of a chip on board (COB) LED light strip, a red-green-blue correlated color temperature (RGBCCT) LED light strip, a red-green-blue-white (RGBW) LED light strip, an RGB LED light strip, and a CCT LED light strip.

15. The mirror according to claim 2, wherein the second annular light guide cover is a polycarbonate (PC) light transmitting cover.

16. The mirror according to claim 1, wherein sawtooth structures are disposed on a light-emitting surface of the first annular light guide cover.

17. The mirror according to claim 1, wherein the annular light transmitting portion is a frosted structure, a fine-grained surface structure, or a sawtooth structure.

18. The mirror according to claim 1, wherein the mirror further comprises a first hanging rack horizontally disposed on a rear of the outer frame of the mirror and/or a second hanging rack vertically disposed on the rear of the outer frame of the mirror.

19. The mirror according to claim 1, wherein the outer frame is an aluminum metal frame.

* * * * *